Sept. 7, 1943.  S. H. RIBBANS  2,328,675
APPARATUS FOR AUTOMATICALLY MEASURING AND DELIVERING
PREDETERMINED QUANTITIES OF MATERIALS
Filed April 4, 1939   8 Sheets-Sheet 1

Stanley Herbert Ribbans
INVENTOR

Myron B. Stevens
ATTORNEY

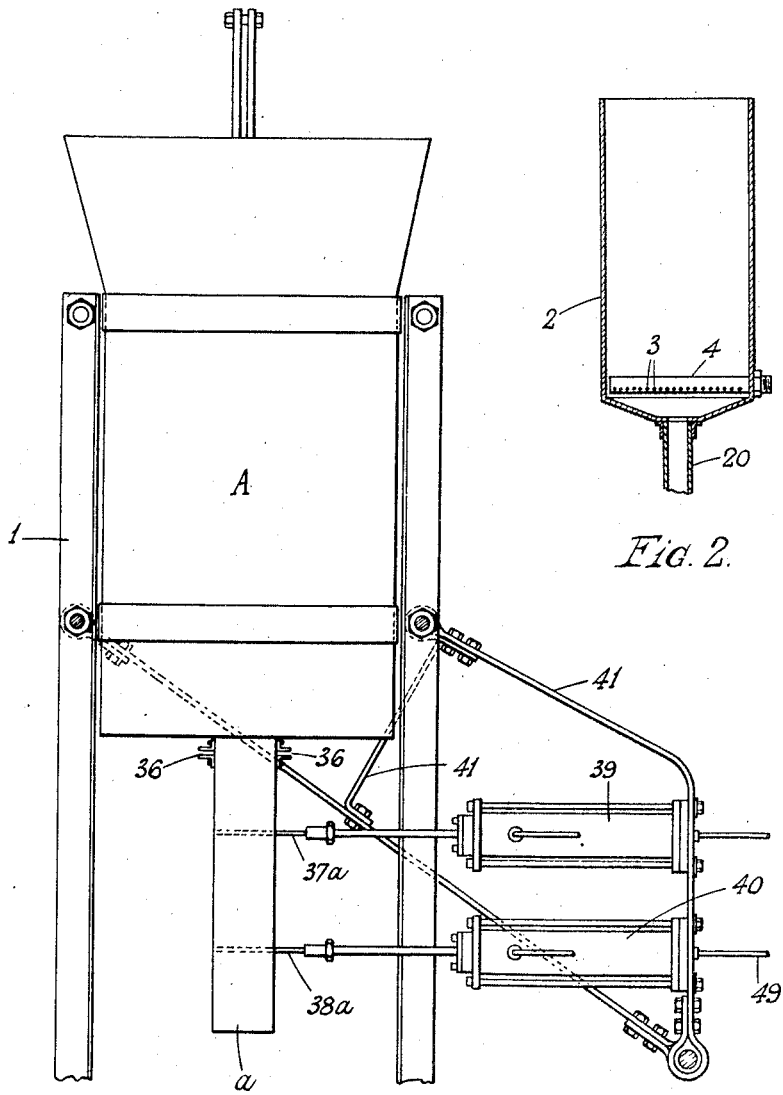

Sept. 7, 1943.    S. H. RIBBANS    2,328,675
APPARATUS FOR AUTOMATICALLY MEASURING AND DELIVERING
PREDETERMINED QUANTITIES OF MATERIALS
Filed April 4, 1939    8 Sheets-Sheet 3
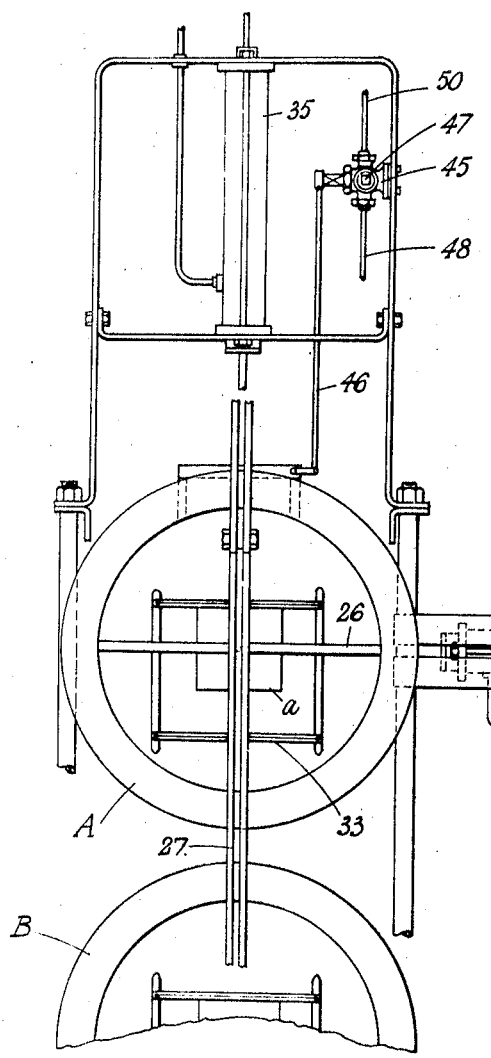
FIG. 6.
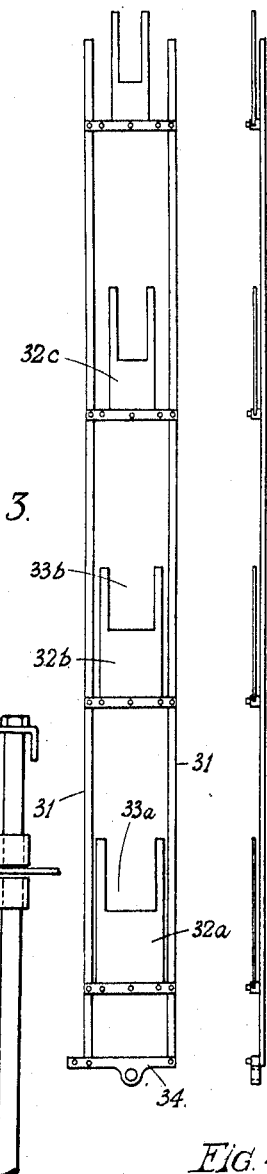
FIG. 3.
FIG. 4.
Stanley Herbert Ribbans
INVENTOR
Myron B. Stevens
ATTORNEY Sept. 7, 1943. S. H. RIBBANS 2,328,675
APPARATUS FOR AUTOMATICALLY MEASURING AND DELIVERING
PREDETERMINED QUANTITIES OF MATERIALS
Filed April 4, 1939 8 Sheets-Sheet 5

Stanley Herbert Ribbans
INVENTOR

Myron B. Stevens
ATTORNEY

Sept. 7, 1943.  S. H. RIBBANS  2,328,675
APPARATUS FOR AUTOMATICALLY MEASURING AND DELIVERING
PREDETERMINED QUANTITIES OF MATERIALS
Filed April 4, 1939  8 Sheets-Sheet 7

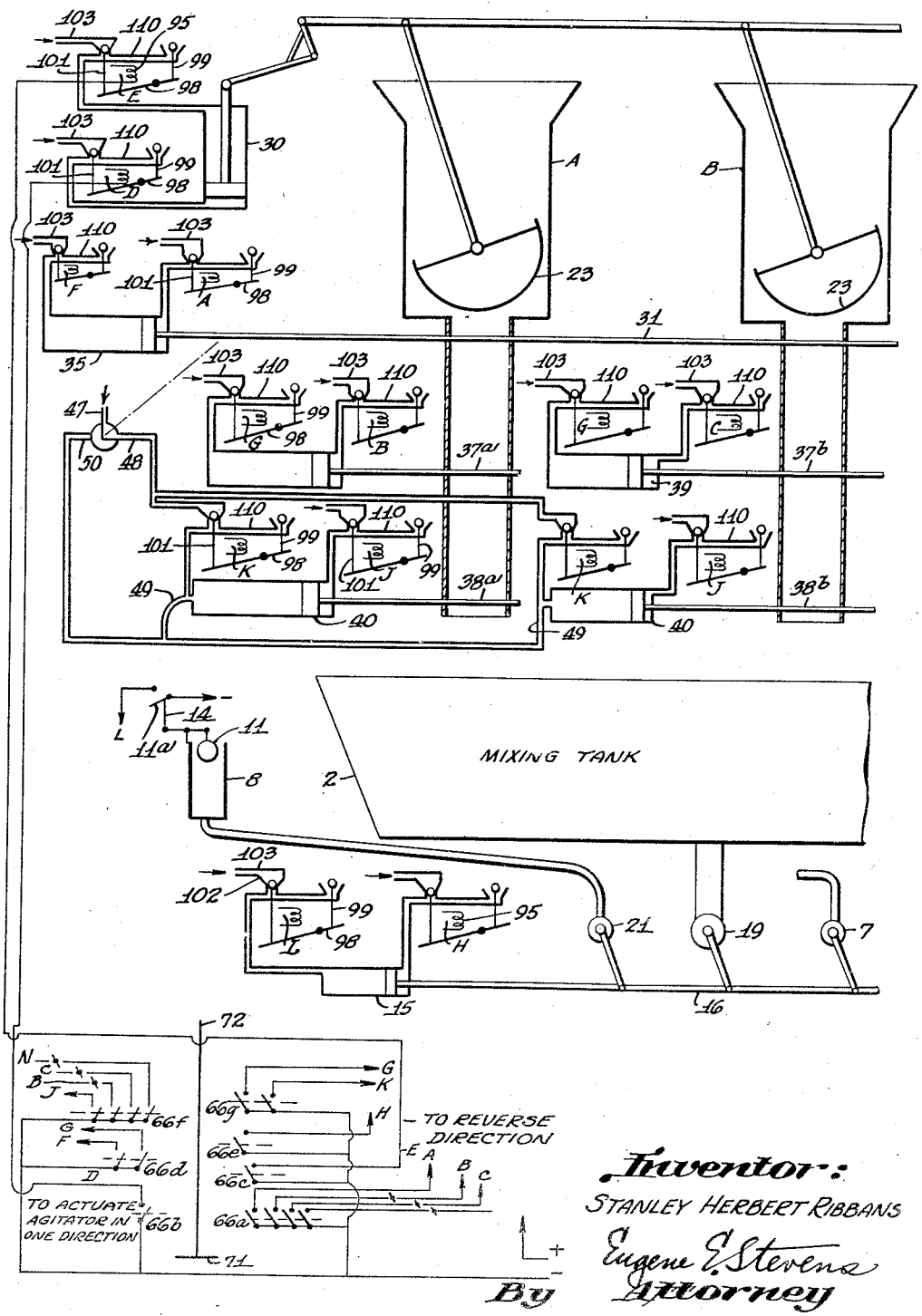

Patented Sept. 7, 1943

2,328,675

UNITED STATES PATENT OFFICE 2,328,675

APPARATUS FOR AUTOMATICALLY MEASURING AND DELIVERING PREDETERMINED QUANTITIES OF MATERIALS

Stanley Herbert Ribbans, London England, assignor to Laundry Automatic Appliances Limited, London, England, a corporation of Great Britain Application April 4, 1939, Serial No. 265,990. In Great Britain August 3, 1938

5 Claims. (Cl. 221—96)

This invention relates to apparatus for automatically measuring and delivering predetermined quantities of materials, and is particularly concerned with apparatus whereby predetermined quantities of dry powdered or granular material, such as soap powder, bleaching powder or other substances used in laundries can be automatically measured out and supplied to a washing machine without extensive manipulations on the part of an attendant or operator.

In some laundry machines the soap or soda or other substances are supplied to the machine in the form of solutions, but other laundries favour the use of powdered soap, soda and other substances and these may be admitted to the washing machines in the required quantities either in the dry state or dissolved in water just before they are admitted to the washing machine. The apparatus of the present invention is therefore designed so that the powdered substances can be automatically measured out to the required quantities and dissolved just before admission to the washing machine, or, by omitting the dissolving operation, the required quantities of the substances can be automatically measured out and discharged into the machine in their dry state.

One object of the present invention is to provide an improved device which can be set to supply in proper sequence correctly measured quantities of powdered or granulated substances to a washing machine without any further manipulations on the part of an operator, and a further object is to provide control mechanism whereby the apparatus for measuring out the desired quantities of materials and, if necessary, dissolving them before they are supplied to the washing machine, is automatically controlled and actuated so that the various operations incidental to such measurement of materials (and may be solution thereof) are carried out in the correct sequence and for the right periods of time.

The apparatus according to the invention utilises gravity feed for the supply of the powdered materials and accordingly there are disposed above the machine a number of containers for the powdered or granular materials and at the bottom of each container is a measure which can be divided into a number of compartments, each holding a predetermined quantity of dry material, by movable slides which are automatically moved in the correct sequence to measure out a desired quantity of material by actuating cylinders and pistons moved by fluid pressure under the control of electro-magnetically operated valves which are controlled in turn by electrical switches operated automatically in the correct sequence.

In order to prevent packing of the dry materials in the containers and consequent failure of a free discharge of such materials from their containers, the latter are fitted with agitators which are also moved by pistons working in cylinders and operated by fluid pressure controlled by electro-magnetically operated valves, so that the agitators are moved automatically when a material is to be discharged from its container.

The measured quantities of dry materials are discharged into a tank disposed beneath the outlet of the measures and from this tank the materials are discharged into the washing machine. The tank is provided with a water supply in the form of a spray which effectively dissolves the powdered material and washes it into the machine when the materials are dissolved just before entry into the machine. The water supply to the tank and the discharge of solution therefrom are controlled by cocks operated by pistons in cylinders supplied with fluid under pressure.

The supply of fluid under pressure (preferably compressed air) is controlled by electromagnetically operated valves of the kind described in our British patent specification No. 473,140 and the valves are arranged in banks for more convenient arrangement, adjustment and control. Each valve has an armature which is lifted by the attraction of an electromagnet to open a port through which compressed air or other fluid is supplied to one of the operating cylinders above mentioned and as the armature drops back upon de-energisation of the electromagnet the supply port is closed and an exhaust port opened.

The energisation of the electromagnets of the valves is controlled by an automatic switchgear consisting preferably of a plurality of tiltable mercury switches carried by a frame and arranged to be tilted in proper sequence by vertical movement of an operating member forming part of a ram or dashpot device which controls the speed at which the sequence of switch movements is carried out. The switches and the operating member and its ram are immersed in oil and the ram is driven downwardly (without operating the switches) by a piston in a cylinder supplied with pressure fluid and the ram and operating member are then returned by the action of weights and during the upward return movement the switches are closed in the correct sequence. The speed of upward travel of the ram, and hence the speed at which the sequence of switching is effected, is controlled by the admission of oil to the cylinder of the ram or dash-pot through a needle valve which can be preset to give the desired timing.

Other details of the invention will be apparent from the following description of the accompanying drawings in which—

Fig. 2 is a section through the tank to show the water supply pipe.

Figs. 3 and 4 are detail views of the main control slide or master slide.

Fig. 5 is a side view of one of the containers and its measure, and the operating cylinders for two of the slides.

Fig. 6 is a plan of the operating end of the row of containers with the agitator-operating cylinder removed to show other parts more clearly.

Fig. 13 is a view like Fig. 1 but which includes a diagrammatic showing of the switch gear and the electromagnetic valves actuated thereby.

Figure 1:
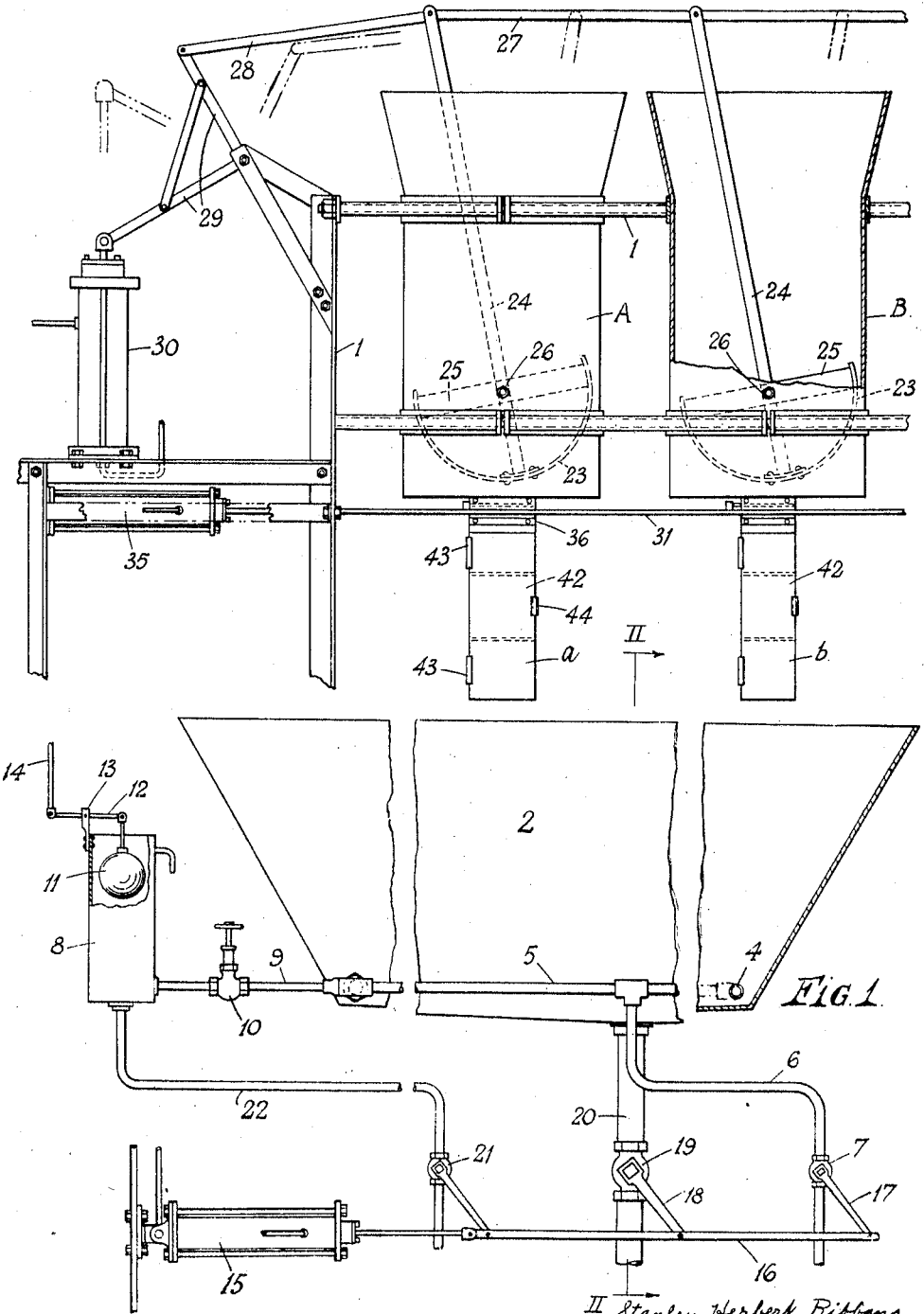
Fig. 1 is a front elevation of the containers for the powders and the mixing tank and their associated parts.

Referring first to Figs. 1 to 6 which show an apparatus by which predetermined measured quantities of materials in the dry state may be dissolved in water and discharged into a washing machine; there are a number of containers or hoppers A, B . . . and each container holds a supply of dry powdered or granulated material. There is one container for each different material so that there are as many containers as there are materials to be supplied to the washing machine, although only two containers are shown in Figs. 1 and 6. Each container has fitted at the bottom thereof a measure $a, b$ . . . by which predetermined quantities of the powdered materials can be measured out in the manner hereinafter described.

The hoppers A, B . . . are supported on a framework 1 above a mixing and dissolving tank 2 so that the measured quantities of materials discharged at the lower ends of the measures $a, b$ . . . fall into the open top of the tank 2. When the materials fall into the tank they are dissolved in water which is injected into the tank through a series of spray holes 3 (Fig. 2) in pipes 4 extending across the tank. The spray holes are preferably positioned so that streams of water from them are directed against the sides and ends of the tank 2 and produce a swirling action which thoroughly dissolves the powdered material and washes down any such material which might be adhering to the sides of the tank. The water is supplied to the pipes 4 from a supply pipe 5 running the whole length of the tank and this pipe is connected through a pipe 6 and a control valve 7 to a supply main of hot or cold water as may be desired.

The amount of water in which the materials are dissolved is determined by the flow of water into a small pilot tank 8 simultaneously with the flow of water into the main tank 2. The pilot tank 8 is located at the side of the main tank 2 and is connected to the water supply pipe 5 by a connecting pipe 9 containing a stop valve 10 so that as the water rises in the main tank the water level in the pilot tank rises correspondingly. The pilot tank 8 contains a float 11 which is hung from one end of a lever 12 fulcrumed at 13 on a bracket attached to the pilot tank. The other end of the lever 12 is connected to a rod 14 which operates an electric switch (not shown) to close the latter when the float 11 rises. When the predetermined water level is reached the float 11 rises and closes the electrical switch which it operates and this causes energisation of one of the electro-magnetic control valves of the tank shown in Figs. 11 and 12 to admit fluid under pressure to a cylinder 15 containing a piston coupled to one end of a connecting link 16 which is thereby moved to close the valve 7 through its operating lever 17. The link 16 is also coupled to the operating lever 18 of a discharge valve 19 controlling the discharge of the solution from the tank through the discharge pipe 20 fitted into the bottom of tank 2 and conveying the solution from tank 2 to the washing machine. The link 16 also operates an outlet valve 21 which permits discharge of the water from the pilot tank 8 through pipe 22.

The three valves 7, 19 and 21 are so arranged that when valve 7 is open the other two are closed, and when the supply of water to the tank 2 is cut off by closure of valve 7 the other two valves 19 and 21 are automatically opened simultaneously to discharge the solution from the main tank 2 into the washing machine and to empty the pilot tank 8, respectively. The use of a pilot tank 8 avoids the risk of the float mechanism becoming clogged by the dissolved materials (which are frequently of a sticky nature) as might happen if the float 11 were suspended in the main tank.

As the substances in the containers A, B . . . are likely to pack tightly and fail to discharge properly, each container is fitted with an agitator consisting of a rectangular frame 23 curved to semicircular form (similar to the agitator shown in perspective in Fig. 7) and attached to the ends of crossed arms 24, 25 which are pivoted on spindles 26 extending across the containers. The other ends of arms 24 of each agitator are extended upwardly and pivoted at their free ends to linkage mechanism 27, 28, 29 by which the agitators can be rocked back and forth by supplying and discharging fluid under pressure to and from an operating cylinder 30 containing a piston which is moved to swing the linkage and the top ends of the arms 24 from the position shown in full lines to the position indicated in the dotted lines, and back again to the original position. The cylinder 30 is bolted to a part of the framework 1 as shown.

The required quantities of materials discharged from the hoppers A, B . . . are measured out by the following arrangement.

Extending beneath all the hoppers A, B . . . is what is termed a master slide. This is shown in detail in Figs. 3 and 4 and consists of a pair of parallel bars 31 supporting between them at intervals flat plates 32$a$, 32$b$, 32$c$ . . . which have openings 33$a$, 33$b$ . . . cut in them. One end of the master slide has a bridge 34 which is connected to the piston rod of an operating cylinder 35 (Fig. 1) which can be supplied with pressure fluid under the control of an electromagnetic valve. Each of the measures a, b . . . is a tube of rectangular section positioned with its longitudinal axis vertical and the plate 32a of the master slide extends across the top of the measure a, while the plate 32b extends across the top of the measure b and so on as shown in Fig. 1. When the master slide is moved towards the right as viewed in Fig. 1 the solid parts of the plates 32a, 32b . . . are positioned across the tops of the vertical tubular measures a, b . . . and prevent materials from falling from the hoppers A, B . . . into the measures, but when the master slide is moved towards the left of Fig. 1 the openings 33a, 33b . . . of all the cut-off plates come into position at the tops of the measures and allow materials to fall into the measures. The master slide is guided during these movements by the bars 31 sliding in guides 36 on the sides of the measures a, b . . .

Each measure is also fitted with two other horizontal slides; a middle slide 37a, 37b . . . and a bottom slide 38a, 38b . . . Each of these slides is movable independently of any of the others and each has its own operating cylinder such as shown at 39 and 40 in Fig. 5. These cylinders are carried by a supporting structure 41 at the back of the framework 1. The middle and bottom slides normally extend completely across the measure to which they are fitted so as to prevent material passing them, but they can be drawn to remove their obstruction across the measure and allow passage of material. The middle slide of each measure is positioned below the master slide at such a distance that the interior of the measure between the master slide and middle slide will hold a definite predetermined quantity of powdered or granular material, for instance 4 oz. of material, while the bottom slide is spaced from the middle slide to give a measure of larger quantity, for instance 8 oz., between these two slides. Thus three different quantities can be measured out by suitable manipulation of the slides; in the examples given the quantities can be either 4 oz., 8 oz., or 12 oz. The quantities are measured by the following manipulations of the slides:

When measuring 4 oz. the middle and bottom slides are closed and the master slide is opened. Then the master slide is closed and both the middle and bottom slides are opened subsequently. For 8 oz. the bottom slide is closed and the master slide and middle slide are opened. Then the master and middle slides are closed and the bottom slide is opened subsequently. To measure 12 oz. the master slide and middle slides are opened while the bottom slide is closed and then only the master slide is closed and the bottom slide is subsequently opened.

The correct manipulations of the slides when any of the three different quantities are to be measured are controlled automatically by the switching means described later. Obviously, of course, the slides may be positioned so that the predetermined quantities are different from these abovementioned or, by providing an additional slide or slides a greater number of different quantities can be measured. Each measure is provided with a door 42 through which the compartments can be cleaned, and the door swings on hinges 43 and is held closed by a catch 44.

As the slides are moved by pistons in cylinders supplied with pressure fluid under the control of electrical means it might happen that owing to an electrical or mechanical fault the bottom slides might accidentally be left opened and when the other slides opened all the material in the hoppers would fall straight into the mixing tank. In order to prevent this possibility there is provided a three way check valve 45 (Fig. 6) which is moved by the master slide through a link 46 and this check valve is connected as follows. The pipe 47 is connected to the supply of pressure fluid for operating the slides, the pipe 48 is connected to the electro-magnetic valve (one of the bank shown in Figs. 11 and 12) which normally controls the supply of air to the rear pipes 49 of the cylinders 40 for causing closure of the bottom slides, while the pipe 50 is connected direct to the pipes 49 of all the cylinders 40. The internal rotary part of the valve 45 has a port which, when the master slide is moved out (i. e., upwardly as viewed in Fig. 6) to allow the various powders to fall into the measures, puts the supply pipe 47 into communication with pipe 50 and hence with the pipes 49 to ensure closure of the bottom slides if any have been left open, but when the master slide returns to closed position the port of the three way valve 45 puts the pipe 47 into communication with pipe 48 for the normal control of the slides by the electro-magnetic valves.

This arrangement is necessary because the moist atmosphere of a laundry makes the insides of the measures damp and the slides are liable to stick, whereas it is necessary for them to be closed quickly.

Figure 7:
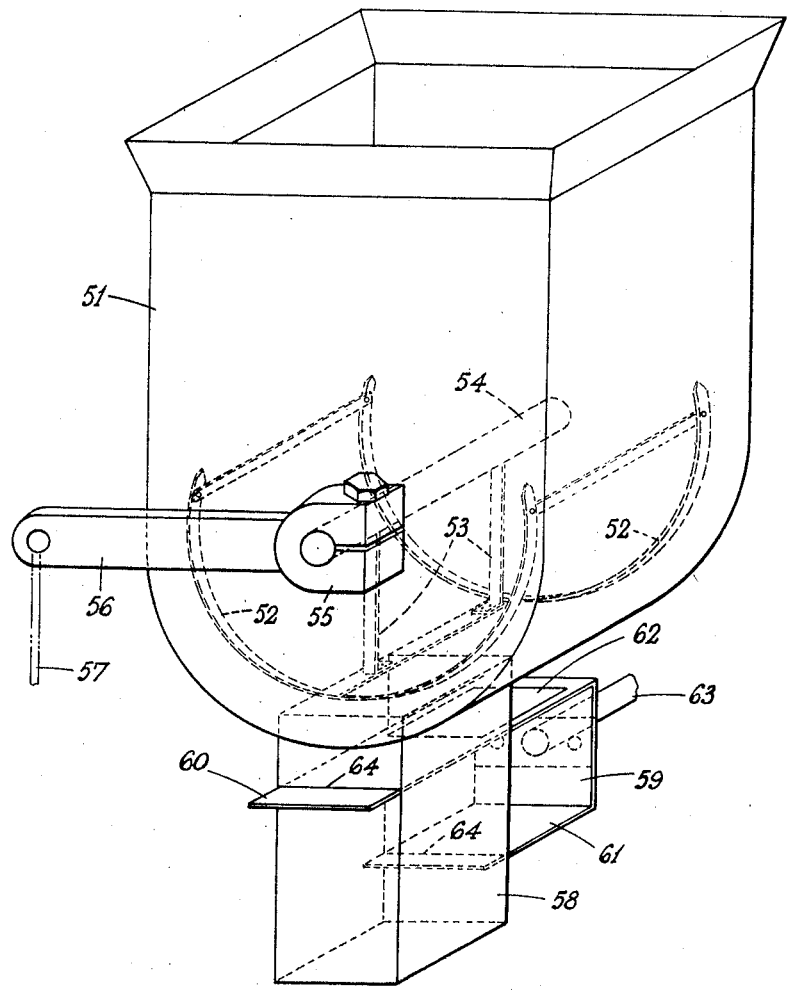
Fig. 7 is a perspective view of a modified form of container and measure.

Fig. 7 shows an alternative arrangement of hopper and measure. In this construction the hopper 51 is of rectangular section with a rounded bottom. As before, the agitator is a rectangular framework curved transversely to the shape shown in dotted lines 52 and is secured to a pair of arms 53 projecting from a shaft 54 extending across the hopper. The shaft 54 projects through the side of the hopper and on one projecting end is clamped the forked end 55 of the arm 56 which has its free end coupled to the piston rod of an operating piston and cylinder (not shown), for example by a link such as indicated in chain dotted lines at 57.

The measure 58 attached to the bottom of the hopper is only suitable for measuring one predetermined quantity of powdered or granular material from the hopper and no master slide is fitted but there is a double slide formed by bending a single strip of plate 59 to a substantially T-shape as shown so that the upper slide 60 is longer than the bottom slide 61. The upper slide 60 has a rectangular aperture 62 cut in it over the bottom slide and the two slides are moved as one by the piston rod 63 of an operating piston and cylinder (not shown). The slides are guided in slots 64 in the sides of the measure 58. In the position shown the powdered material in the hopper is, of course, prevented from falling into the measure, but if the slides are pushed in the bottom slide 61 closes the measure transversely while the aperture 62 in the upper slide 60 comes into the measure and allows the material to fill the space between the two slides. This space between the slides is such as to hold a desired measured quantity of material and when the slides are returned to the position shown, the measured quantity of powder is allowed to fall into the washing machine or into a dissolving tank as in the construction described with reference to Fig. 1.

The forward edge of the aperture 62 in the top slide is not directly over the front edge of the bottom slide 61 but the latter projects sligthly beyond a line vertically below the forward edge of the aperture. It has been found that this arrangement, coupled with a fairly rapid movement of the slides, avoids any risk of the powder in the hopper dropping straight through the measure.

Several hoppers of the kind shown in Fig. 7 may be aligned above a mixing tank as in the construction shown in Fig. 1 and all the agitators may be coupled together and operated by a single actuating cylinder.

The provision of a rounded bottom to the hopper has been found advantageous in avoiding wastage of unused powder which tends to pack round the edge of the bottom in the flat-bottomed containers.

It has also been found to be important that the agitators should be of the shape shown in both types of hopper, namely curved semicircularly and swinging on a horizontal spindle, as with this arrangement there is a tendency to lift the heavier materials (such as soda) and keep them in a finely broken condition. If this upward movement is not made use of the heavier materials tend to be compressed into a solid mass by the agitator which then requires excessive power for its operation, but by the use of the partly upward action even the heaviest materials are kept in a free condition to enable accurate quantities to be measured. Also in the case of the agitators shown in Fig. 1, the upwardly extended arms serve to stir up the powder at the top of the hopper and keep it in a freely running condition.

Figure 8:
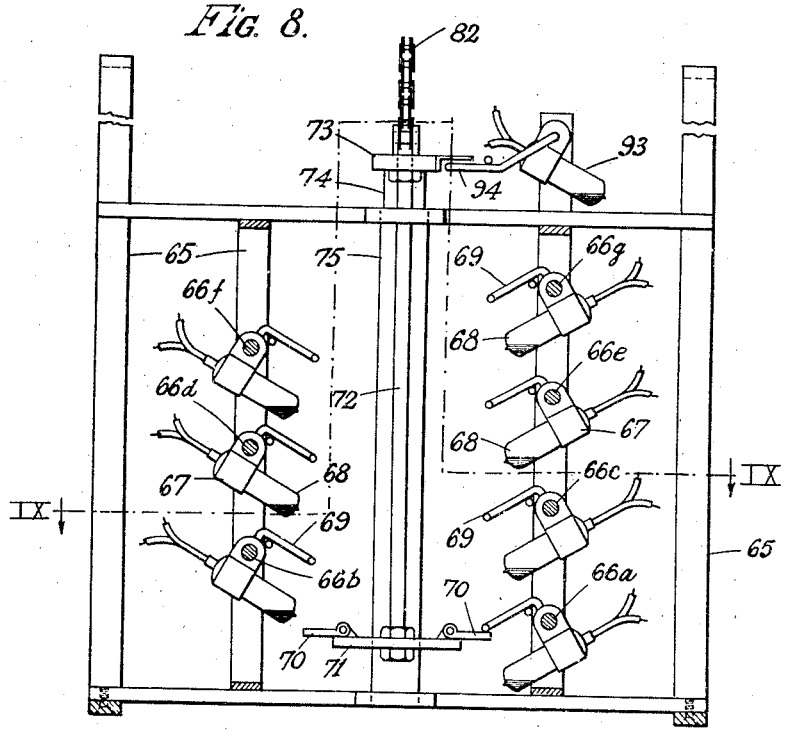
Figs. 8 and 9 are vertical and horizontal sections, respectively, of the control switchgear, Fig. 8 being a section on line VIII—VIII of Fig. 9 and Fig. 9 being a section on the line IX—IX of Fig. 8 with portions removed for clarity.
Figure 9:
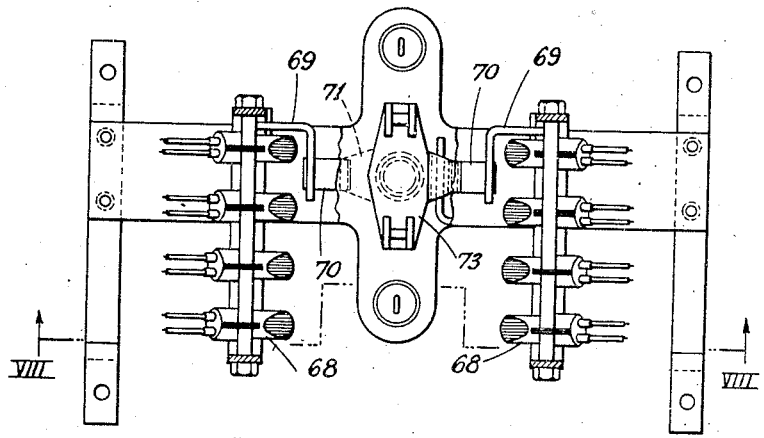
Figure 10:
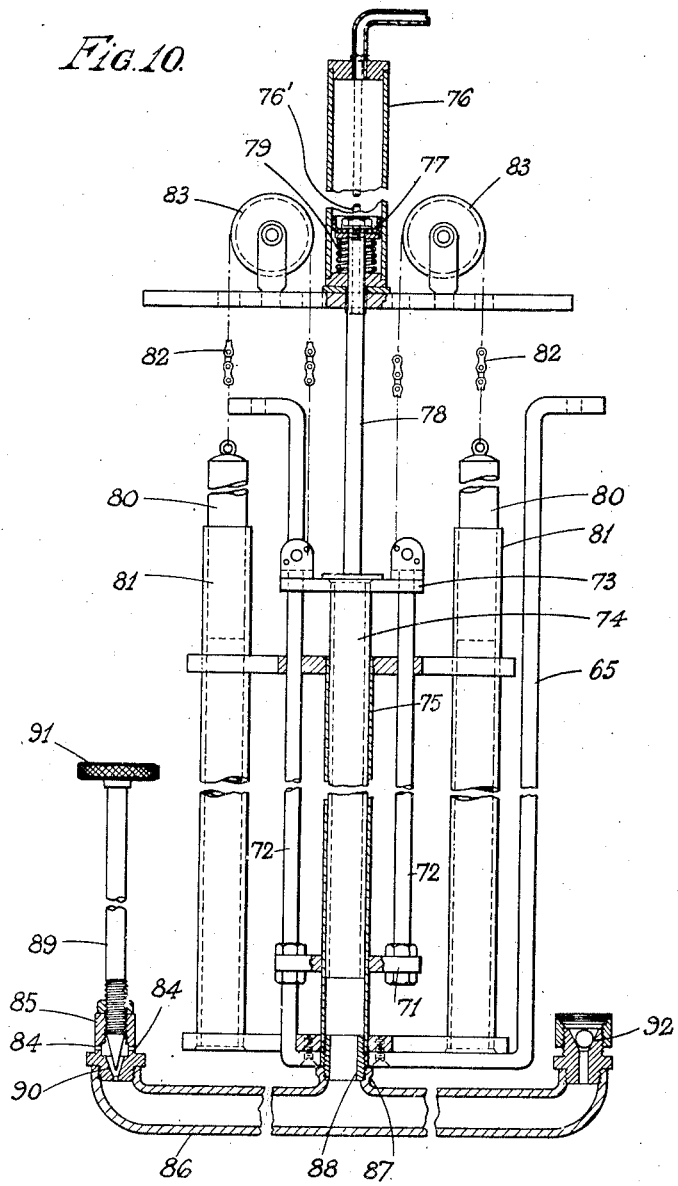
Fig. 10 is a side elevation of the operating mechanism for the switchgear (the latter not being shown in order to avoid confusion).

The switchgear for controlling the operation of the parts previously described is illustrated in Figs. 8 and 9, and the switch operating means are shown in Fig. 10.

The switchgear consists of a frame 65 on which are mounted a plurality of separate horizontal spindles 66a, 66b . . . and each spindle has secured on it a number of holders 67 carrying mercury switches 68 which are of any well known form and do not form part of the present invention. Each of the spindles 66 has a projecting arm 69 which can be raised to turn its spindle and tilt the switches mounted thereon and close the switch contacts. The spindles are tilted in turn by the upward travel of striking plates 70 hinged on a member 71 supported by rods 72 from a plate 73 attached to the top end of a ram 74 movable vertically in a cylinder 75. The striking plates 70 are hinged to swing upwardly so that they can travel downwards past the arms 69 without tilting the switches. The ram and its cylinder form a dashpot device and the ram is driven down into the cylinder 75 by the admission of fluid under pressure to an actuating cylinder 76 (Fig. 10) mounted above the frame 65 by holding bolts 76' and containing a piston 77, having its rod 78 abutting against the top end of the ram, and a return spring 79. The upward travel of the ram is caused by weights 80 guided in tubes 81 and connected to the plate 73 by chains indicated at 82 passing over pulleys 83.

The switchgear is immersed in oil contained in a surrounding tank or casing (not shown) and the upward travel of the ram 74 is controlled by the flow of the oil into the cylinder 75 through the inlet ports 84 of the needle valve 85 screwed into the end of the horizontal tube 86 which has a branch 87 screwed on to a union 88 screwed into the lower end of the cylinder 75. The needle 89 of the valve 85 can be screwed towards or away from its seating 90 by turning the knurled disc 91. The outflow of the oil into the surrounding tank as the ram 74 is driven down is permitted by the non-return ball valve 92 on the other end of the horizontal tube 86. When the ram reaches the limit of its downward travel a projection on the plate 73 tilts a mercury switch 93 by engagement with the arm 94. Closure of this switch 93 lights a pilot lamp as an indication to the operator.

Figure 11:
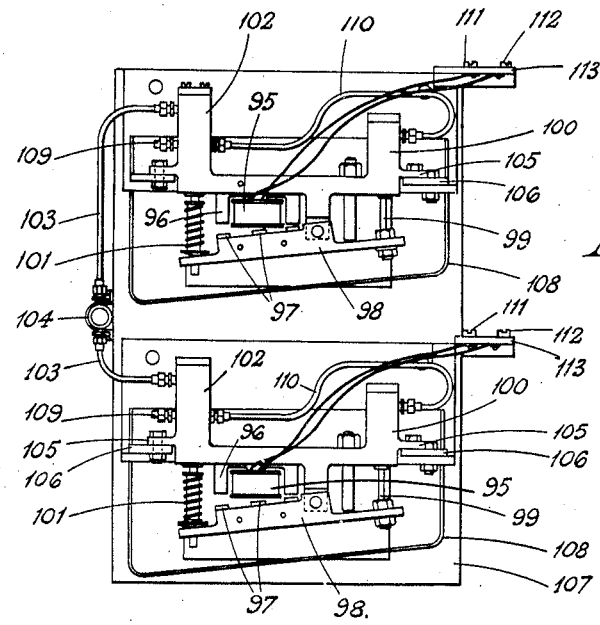
Figs. 11 and 12 are views of the banks of electro-magnetically-operated valves controlling the supply of fluid under pressure to the various operating cylinders.
Figure 12:
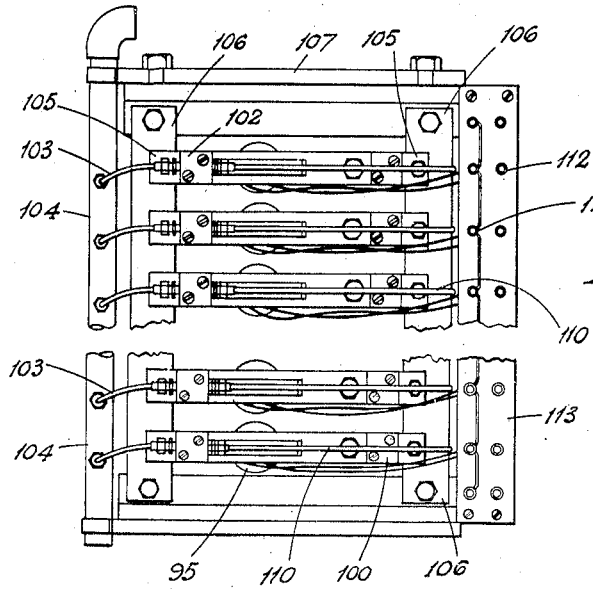

Each one of the switches 68 controls one of the electro-magnetically operated valves of the banks of valves shown in Figs. 11 and 12. Each of the valves in the banks is the same as the others and is similar to that described and illustrated in our British patent specification No. 473,140. Each valve has an operating coil 95 wound on a magnetic core 96 and when the magnet is energised it attracts an armature 97 forming part of an unbalanced lever 98 which normally occupies an inclined position as shown but is pulled up into a horizontal position when the electromagnet is energised. The normally raised end of the lever 98 acts through a push rod 99 to hold open a ball valve contained in the body 100 and the other end of the lever 98 acts through the part 101 to open an inlet valve (contained in the inlet valve body 102) when the lever 98 is pulled up into a horizontal position. Each inlet valve is connected through a tube 103 with a supply main 104 of fluid under pressure, e. g., compressed air, and controls the supply of compressed air to one end of one of the operating cylinders previously described. There are thus two electromagnetic valves for each of the operating cylinders and one valve admits pressure fluid to one end of the operating cylinder to move its piston in one direction while the other electromagnetic valve admits pressure fluid to the other end of the same cylinder to move the piston back to its original position.

Each complete electromagnetic valve is bolted by means of lugs 105 to bars 106 forming part of a frame 107 so that the valves can be arranged in two banks—for example, all the valves which control the admission of fluid pressure to the rear ends of the operating cylinders might be located in the top bank, while all the valves which admit fluid pressure to the opposite ends of the cylinders to produce return movements of the pistons might be located in the lower bank. This makes for convenience in connection and adjustment. The lower parts of the complete valves are immersed in insulating oil contained in tanks 108 and each valve is provided with a union 109 for the connection of a pipe communicating with the end of the operating cylinder to which the particular valve admits pressure fluid and each valve also has a pipe 110 connecting the union 109 with the exhaust valve so that the other end of the operating cylinder is opened to exhaust as soon as the supply of pressure fluid is cut off by closure of the inlet valve 102 as the lever 98 drops back into its normal position.

The leads from the operating coils 95 are connected to terminals 111 and 112 on an insulating strip 113. The terminals 111 are all connected together as shown and connected to one side of a source of electric current. Each of the other terminals 112 is connected direct to one lead of one of the mercury switches shown in Fig. 8 and the other leads of the mercury switches are connected to the other pole of the source of current. However, those mercury switches which control the movements of the middle and bottom slides have ordinary manually-operated selector switches connected in series with them so that they are inoperative to complete a circuit controlling a slide unless their particular series switch has been closed by the operator when preselecting the amounts of powdered materials to be measured.

The operation of the mechanism previously described, as applied to the case of the control of 3 hoppers when each hopper has a measure for three different quantities of materials is best understood by reference to Fig. 13 in connection with Figs. 1, 8 and 12 and is as follows:

The switch gear of Fig. 8 is shown diagrammatically in Fig. 13 at the lower part thereof. To avoid a complicated system of pipes and connections, the magnetic valves which operate the various fluid cylinders are shown diagrammatically adjacent such cylinders rather than grouped as in Fig. 12. To avoid a maze of wires, the ground wires for the magnetic valves have been omitted and the current carrying leads from the switches 66a to 66f inclusive have been broken and designated by the letters A to L inclusive. For simplicity, but two hoppers have been shown in Figs. 1 and 13 but the current carrying leads for an additional hopper are shown at M, N in switches 66a and 66f respectively of the switch gear.

The bottom spindle 66a of the mercury switch gear has on it four mercury switches, one of which is connected by lead A so that its closure produces opening of the master slide 31, while each of the other three is connected by one of leads B, C, M so that its closure produces opening of one of the middle slides 37a, 37b if its series manual switch has been previously closed by the operator when determining the required quantities of the different materials.

Spindle 66b carries one switch which, when closed through lead D, produces movement of the agitators in one direction and spindle 66c has one switch which through lead E produces return motion of the agitator. Spindle 66d has on it two switches, one of which through lead F controls the closing of the master slide 31 while the other through leads G controls the closing of all the middle slides 37a, 37b. Spindle 66e carries one switch which through lead H controls the opening of the water supply valve 7 to the mixing tank. This valve is closed through the lead L of the switch 11a of the float 11. Spindle 66f carries four switches, one of which through lead J controls the opening of all the bottom slides 38a, 38b, while each of the other three through leads B, C, N controls the opening of one middle slide 37a, 37b according to the previous setting of the manual series switches. The spindle 66g has two switches, one of which through leads K controls closure of all the bottom slides 38a, 38b while the other switch through leads G controls the closure of all the middle slides 37a, 37b.

When the predetermined quantities of powdered materials are to be measured out and discharged into the machine the operator sets the manual selector switches in series with the mercury switches on shaft 66a and 66f according to the desired amounts of materials and then presses a starting knob or switch which permits pressure fluid to enter the upper end of the cylinder 76 to force down the ram 74. As the ram travels down, the hinged striking plates 70 slide past the arms 69.

The operator keeps the supply of pressure fluid open until the pilot light is illuminated owing to closure of the switch 93 when the ram reaches the bottom of its travel. The operator then releases the starting knob and the upper end of cylinder 76 is opened to exhaust so that the piston 77 and its rod 78 return immediately under the action of spring 79, while the ram 74 starts to rise under the action of the counter weights 80 and its speed is controlled by the admission of oil through the ports of the needle valve 85 (Fig. 10). As the ram travels upward the striking plates 70 tilt each of the mercury switches 68 in turn so that first the master slide is opened with such of the middle slides as are determined by the pre-set arrangement of the manual series switches and then the master slide, and the middle slides previously opened, are closed. This is followed by the admission of water to the mixing tank and then the bottom slides are opened with such of the middle slides as are pre-selected to allow discharge of the correct quantities of the powdered materials into the mixing tank. Lastly the bottom slides and the middle slides are closed and the operation is completed with the ram at its uppermost position ready for controlling a fresh measurement and discharge of materials.

If desired a separate pilot light may be provided to indicate when operation is completed by the ram reaching its uppermost position.

Instead of the ram 74 being forced down by the piston working in the cylinder 76 it can be arranged to be pulled or pushed down by direct manual action, or it can be pulled down by electrical means. The manual switches controlling the selection of the quantities of materials are preferably ordinary tumbler switches and are grouped on a control board for convenience in operation. Any other suitable form of selector switches may be employed and these switches can be of the delayed action type, that is to say of the kind which remain closed for a predetermined length of time after the operator has set them, in order to allow the switch gear of Fig. 8 to carry out its operations and then the selecting switches would automatically open their circuits.

The ram can be returned to its uppermost position by the use of weights as described or this return movement can be effected by a return spring, although weights have been found more satisfactory. Also it is not essential to use oil for returning the upward movement of the ram, as air would be sufficient for this purpose, but the immersion in oil of the switch gear of Fig. 8 has the advantage of keeping all the parts in a freely moving condition, particularly as the device is likely to be installed in the damp atmosphere of a laundry, and this oil is naturally used for returning the return movement of the ram which acts as a dashpot.

What I claim as my invention and desire to secure by Letters Patent is:

1. Automatic measuring apparatus comprising in combination, a plurality of containers; an open-ended measure on the bottom of each container; slides movable transversely across said measure for selectively dividing it into compartments of different fixed capacities; a master slide movable transversely of all the measures simultaneously; fluid-actuated means for moving said slides and said master slide; and electrical switchgear operating automatically for controlling said fluid-actuated means to move the slides in correct sequence for selectively measuring and discharging different predetermined fixed quantities of materials.

2. Automatic measuring apparatus comprising in combination, a plurality of containers; an open-ended measure on the bottom of each container; slides movable transversely across said measure for selectively dividing it into compartments of different fixed capacities; a master slide movable transversely of all the measures simultaneously; fluid-actuated means for moving said slides and said master slide; a mixing tank beneath said measures; means for spraying liquid into said tank; a discharge outlet at the bottom of the tank; fluid-operated means for controlling said spraying means and the discharge outlet; and electrical switchgear operating automatically for controlling said fluid-operated means to move the slides and admit liquid into the tank and discharge the contents thereof in predetermined sequence.

3. Automatic measuring apparatus comprising in combination, a plurality of containers adapted to contain dry pulverulent material, measuring means at the bottom of each container and including means for selectively measuring and discharging different predetermined fixed quantities of materials, a single mixing and dissolving tank beneath said containers and measuring means adapted to receive materials from all of said measuring means, means for supplying to said tank fluid adapted to dissolve said materials and form a solution, fluid actuated means for operating said measuring, discharging and fluid supplying means, and means for controlling all of said fluid actuated means in sequence.

4. The structure of claim 3, and said last named means comprising an electrical switch gear.

5. In an automatic measuring apparatus, wherein a single means simultaneously opens and closes a plurality of measuring chambers, wherein each measuring chamber includes plural means for selectively dividing it into compartments of different fixed capacities, and wherein fluid actuated means operate said single and plural means; means for actuating said fluid actuated means to actuate said single and each of said plural means in a predetermined sequence to achieve measuring and discharging of different predetermined quantities of materials from said compartments, comprising an electrical switch gear having a vertically movable actuating member, a plurality of vertically superposed tiltable mercury switches, means on said member and engageable with said switches successively for tilting said switches on upward travel only of said member, an operating piston and cylinder therefor, means for supplying fluid under pressure to said cylinder for moving said member in a downward direction, a ram and cylinder therefor, means connecting said ram to said member, means for supplying fluid under pressure to said ram cylinder to move said ram and member in an upward direction, and a needle valve controlling the admission of fluid to said ram cylinder whereby to control the speed of upward travel of said member.

STANLEY HERBERT RIBBANS.